Mar. 6, 1923.
O. R. WIKANDER
ROLLER BEARING
Filed Jan. 12, 1922
1,447,704
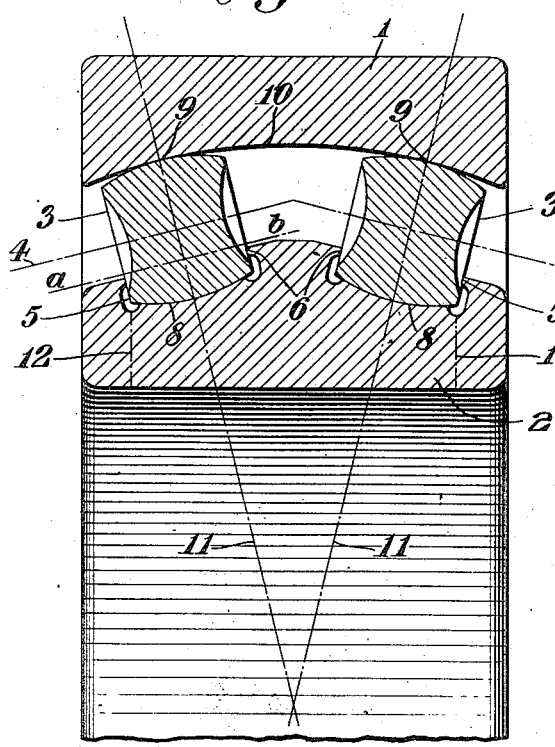
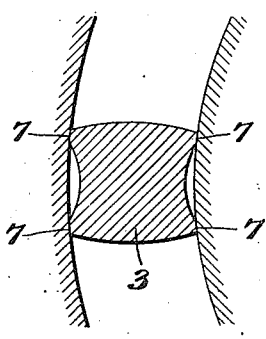
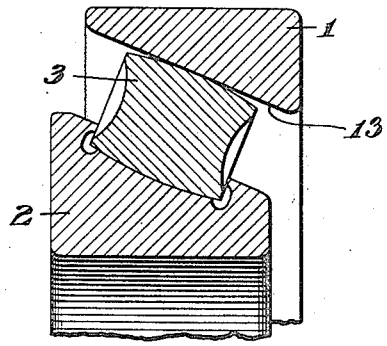
Oscar R. Wikander
INVENTOR
BY Francis Marburg
ATTORNEY Patented Mar. 6, 1923.

1,447,704

UNITED STATES PATENT OFFICE.

OSCAR R. WIKANDER, OF GLEN RIDGE, NEW JERSEY, ASSIGNOR TO THE SKAYEF BALL BEARING COMPANY, OF HARTFORD, CONNECTICUT, A CORPORATION OF CONNECTICUT.

ROLLER BEARING.

Application filed January 12, 1922. Serial No. 523,807.

*To all whom it may concern:*

Be it known that I, OSCAR R. WIKANDER, citizen of the United States, and resident of Glen Ridge, in the county of Essex and State of New Jersey, have invented certain new and useful Improvements in Roller Bearings, of which the following is a specification.

This invention relates to anti-friction roller bearings and has for an object to provide a bearing to carry heavy radial load and, in addition, thrust load, in either direction.

These bearings have rollers, the axes of which are inclined in relation to the axis of the bearing, such rollers having point contact with one of the raceways, and line contact with the other, the ends of the rollers being guided by flanges on the latter raceway, such flanges fitting closely against the ends of the rollers.

Roller bearings of this type have in the past only been used where guiding flanges were necessary, in order to carry thrust forces acting on the rollers or to retain the rollers in the bearing, or where line contact was required in order to prevent the rocking of the roller on the raceway.

The present invention discloses the use of such guiding flanges, and line contact of the roller against the raceway between such flanges, in bearings, where apparently neither radial nor thrust loads acting on the bearing would tend to displace the rollers in the direction of their axes or to produce any rocking of the rollers, and where apparently no guide flanges would be necessary in order to retain the rollers in their relative position to the race, because the shape of the raceway would apparently prevent said rollers from skewing or moving in axial direction.

Experience has, however, shown, that the apparently useless complication of the bearing, which the guide flanges constitute in such cases, improves the operation of the bearing to a considerable degree, and thus marks an improvement upon such bearings.

The accompanying drawing illustrates an embodiment of this invention.

Figure 1 is a longitudinal section through the axis of the bearing.

Fig. 2 is a section along the line *a. b.* of Figure 1.

Fig. 3 is a modification of Figure 1, wherein only one row of rollers is used.

The bearing consists of an outer ring 1, and inner ring 2, and rows of rollers 3. The axes 4 of each row of rollers are all located on a cone, the apex of which is situated on the axis of the bearing. The rollers are symmetrical around their transversal central planes, and each such plane passes through the center point of the bearing. The position of this plane in relation to the axis of the bearing is shown by its line of intersection 11 with the plane of Figure 1. In one of the races, preferably the inner one, the roller is guided by flanges 5 and 6, and the ends of the roller cooperate with said flanges in four points of contact 7, see Figure 2.

The generatrix 8 of the roller fits, with line contact, the bottom of the corresponding groove in the inner race. The roller contacts with the outer race in the transversal central plane of the former at the point 9. The raceway 10 of the outer race is a surface of revolution, preferably a sphere, and the rollers are shaped so as to produce a close osculation between roller and race at the point of contact 9.

On account of the symmetrical shape of the roller around its transversal central plane and due to the fact that the force of reaction from the outer race acts in radial direction along said plane it follows that the roller is not subject to any thrust pressure, as is the case in known designs of similar bearings, in which the rollers are conical in shape. In order to obtain perfectly true rolling, it would be necessary that the rollers be cones, the apices of which being located at the point where the axes of the rollers intersect with the axis of the bearing. On account of the symmetrical shape and the curved rolling surface of the rollers 3, thus there is not true rolling but a certain amount of sliding friction between roller and race. There is also a certain tendency of skewing, which tendency, however, is counteracted by the fact that the rollers are guided at four points 7 as shown in Figure 2.

In case of purely radial load, the latter distributes itself evenly on the two rows of rollers. In case of pure thrust load or combined radial and thrust load, one of the rows of rollers carries heavier load than the other.

If the raceway 10 of the outer race is spherical around the center of the bearing, the latter will be self-aligning. It will also be self-aligning, though operation under great misalignment will be less satisfactory, if the generatrixes of all the rollers at the points of contact 9 are located on a sphere.

Due to the feature that the central transversal plane through every roller passes through the center of the bearing, the latter will, however, always be self-aligning to a moderate extent.

Either of the above self-aligning constructions greatly facilitates the introduction of the rollers in the bearing, because it is possible to turn the inner ring with the rollers around the center of the bearings in order to expose, insert or remove the rollers. In cases where the roller is comparatively short and the curvature of its generatrix at the point "9" or the curvature of the generatrix of the outer race at said point, does not materially differ from a sphere around the center of the bearing, it is possible, on account of the looseness between rollers and races, to use the same method of insertion of the roller, that is, by swinging the inner race of the roller around the center of the bearing. If the curvature of the rollers does not permit the use of this method it may be found advisable to split one of the races along a transversal plane for example as indicated by the line 12 in Figure 1.

Figure 3 shows the longitudinal section of a bearing which carries only thrust load or combined load with a large thrust component, the design of which is substantially identical to one half of the bearing shown in Figure 1, except that the outer raceway 13 is a cone.

It is obvious that many changes may be made in the design of this bearing without departing from the spirit of the invention. It is possible to make the generatrix of the roller a straight or a concave line, always providing that one of the rings, preferably the inner, is so shaped as to provide for line contact, and that the other ring is so shaped as to obtain point contact and close osculation at the point 9, and that the roller and the guides are so shaped as to obtain a four point guiding to prevent skewing of the rollers.

I claim as my invention:

In a roller bearing, the combination of an outer ring, sets of rollers, the axes of said rollers being inclined in relation to the axis of the bearing, each roller being symmetrical around its transversal central plane, said rollers contacting with the outer race with point contact in said plane, an inner ring with grooves, in which the rollers fit with line contact, and guiding flanges which bear against both ends of the rollers, there being at least two points of contact between roller and flange at each end of the roller, said points of contact being disposed in the direction of rolling.

Signed at city of New York in the county of New York and State of New York this twenty-seventh day of December A. D. 1921.

OSCAR R. WIKANDER.